United States Patent [19]
Reulet et al.

[15] 3,678,091
[45] July 18, 1972

[54] PROCESS FOR THE PREPARATION OF UNSATURATED ALPHATIC NITRILES BY THE OXIDATION OF OLEFINS

[72] Inventors: Philippe Reulet, Mourenx; Alain Pfister, Pau; Jacques Tellier, Pau; Jean-Henry Blanc, Pau, all of France; Kirsten Borre Jorgensen, Holte; Hans Bohlbro, Lyngby, both of Denmark

[73] Assignee: Societe Anonyme dite: Societe Nationale Des Petroles D'Aquitaine, Courbevoie, France

[22] Filed: June 16, 1969

[21] Appl. No.: 833,670

[30] Foreign Application Priority Data

June 19, 1969  France.................................69155509

[52] U.S. Cl..........................................260/465.3, 252/437
[51] Int. Cl.....................................................C07c 121/02
[58] Field of Search................................................260/465.3

[56] References Cited

UNITED STATES PATENTS

| | | | |
|---|---|---|---|
| 3,164,626 | 1/1965 | Minekawa et al. | 260/465.3 |
| 3,253,014 | 5/1966 | McDaniel et al. | 260/465.3 |
| 3,262,962 | 7/1966 | McDaniel et al. | 260/465.3 |
| 3,424,781 | 1/1969 | Capp et al. | 260/465.3 |
| 3,433,823 | 3/1969 | McMahon | 260/465.3 |
| 3,365,482 | 1/1968 | Khoobiar | 260/465.3 |
| 3,200,141 | 8/1965 | Milberger | 260/465.3 |

Primary Examiner—Joseph P. Brust
Attorney—Ostrolenk, Faber, Gerb & Soffen

[57] ABSTRACT

A process for the preparation of unsaturated aliphatic nitriles by the oxidation of olefins in the presence of ammonia, consists in reacting the hydrocarbon or hydrocarbons with oxygen and ammonia in the presence of a catalyst system containing the elements phosphorus, vanadium and molybdenum in the form of a phosphovanadomolyboic heteropolyanion; a part or the whole of said elements may be combined with tellurium or antimony.

11 Claims, No Drawings

PROCESS FOR THE PREPARATION OF UNSATURATED ALPHATIC NITRILES BY THE OXIDATION OF OLEFINS

The present invention relates to a process for the production of unsaturated aliphatic nitriles by the oxidation of olefins in the presence of ammonia; it concerns more particularly the manufacture of acrylonitrile. It is especially concerned with a new catalyst for carrying out such manufacture.

The oxidation of olefins, and especially of propylene, in the presence of ammonia has been the subject of a certain amount of investigation. For example, investigations have been made into the use of catalysts based on phosphomolybdic acid or its ammonium salt, especially in combination with the oxides of other metals such as tellurium, molybdenum, copper, vanadium, iron, bismuth and selenium. Such a catalytic mixture may be deposited on a supporting material based on a gel of silica, kaolin or aluminia. In particular, catalytic mixtures composed of ammonium phosphomolybdate and tellurium oxide deposited on alumina, have been proposed in French Pat. specification No. 1,292,673, which give yields of acrylonitrile of 64.3 percent; mixtures of ammonium phosphomolybdate, tellurium oxide and possibly also vanadium oxide deposited on kaolin have been proposed in French Pat. specification No. 1,255,121, which give yields of acrylonitrile of 24 percent and 28.3 percent; and mixtures of ammonium phosphomolybdate and tellurium oxide deposited on silica have been proposed in U.S. Pat. specification No. 3,164,626, which give yields of acrylonitrile of 42.3 percent.

These figures are not given in a comparative sense because they are the result not only of different catalytic compositions and different supporting materials, but also of different operating conditions (temperature, contact time and composition of the reaction mixture). Catalysts are properly used only when under the same operating conditions, and this is not the case in all the examples cited above. These figures are given simply in order to show that catalysts prepared from phosphomolybdic acid enable acrylonitrile to be obtained with satisfactory yields.

These catalysts obtained from phosphomolybdic acid, and combined with the oxides of certain metals, particularly tellurium, generally have poor stability at temperatures of the order of 450° C at which they are used and they have a tendency to decompose, regardless of the supporting material upon which they are deposited. It seems that after treatment at such a temperature the phosphomolybdate anion decomposes into a mixture of oxides; analysis of the catalyst by X-ray diffraction gives rise to the lines corresponding to molybdenum oxide.

Thus, the values already given for the yields of acrylonitrile are only valid for relatively short operating times.

The research which led to the present invention has made it possible to provide a catalyst whose instability at high temperature is substantially reduced as compared with the prior proposals mentioned above, and which possesses a prolonged length of life under high temperature operating conditions. Furthermore, this catalyst makes possible the transformation of unsaturated hydrocarbons into acrylonitrile with good yields, in the presence of oxygen and ammonia.

The process provided by the present invention for the preparation of aliphatic nitriles by the oxidation of olefins in the presence of ammonia consist in reacting the hydrocarbon, oxygen and ammonia in the presence of a catalytic system containing the elements phosphorus, vanadium and molybdenum in the form of a phospho-vanadomolybdic heteropolyanion. The fundamental characteristic of this catalyst is that the vanadium is not associated with the phosphomolybdic anion in the form of $V_2O_5$, but in the form of the phosphovandomolybdic anion.

The excellent results obtained with this catalyst are particularly surprising because it has already been shown that the introduction of vanadium in the form of $V_2O_5$ has an unfavorable effect on the selectivity with regard to acrylonitrile. There was therefore nothing to lead one to expect that the introduction of this same element in another form would not only confer excellent stability on the catalyst but would also increase the selectivity with regard to acrylonitrile. With regard to the question of stability, it has been shown that a catalyst constituted by the phosphovanadomolybdate of, for example, tellurium, is not decomposed at high temperature into molybdenum and vanadium oxides as is the case with a catalyst constituted by tellurium phosphomolybdate, to which it is possible to add $V_2O_5$. The tellurium or other cation which is attached to the heteropolyanion and which is one of the most active components of the catalyst, is present almost intact in the catalyst after use, when the catalyst, at the time when it was put into use, contained vanadium in the form of a phosphovanadomolybdate, while if a catalyst based on a phosphomolybdate is used, a loss of 77 percent of tellurium is noted. The increased stability as well as the increase in selectivity clearly shows that the catalyst according to the present invention is in no way analogous to a catalytic mass constituted by the three elements P, Mo and Te, or to those catalysts in which the vanadium is present in the form of $V_2O_5$.

The cation attached to the heteropolyanion may be $H^+$, $NH_4^+$, $Sb^{3+}$, $Te^{4+}$, or $Te^{6+}$; according to a preferred mode of carrying the invention into effect, the catalytic system used comprises tellurium phosphovandomolybdate. It may be represented by the following formula:

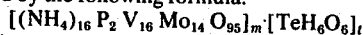
$[(NH_4)_{16} P_2 V_{16} Mo_{14} O_{95}]_m \cdot [TeH_6O_6]_t$ in which $t/m$ may be from 0 to 30 and preferably from 12 to 18.

The temperature of the reaction is preferably between 300° and 600° C.

The contact time between the reaction materials and the catalytic system can vary widely, for example between 0.15 and 15 seconds. The contact time depends on the working temperature.

According to an especially preferred feature of the invention, the contact time between the gases and the tellurium phosphovanadomolybdate is from 1.5 to 8 seconds for temperatures between 350° and 450° C.

The proportion of olefins in the reactants is preferably between 1 and 15 percent by volume, that of ammonia between 1 and 15 percent and that of oxygen between 2 and 15 percent, the remainder being constituted by an inert gas.

Molecular oxygen may be used in the form of oxygen as such, but for reasons of convenience it is preferred to use air.

It has been found that although the presence of water is not indispensable it is nevertheless to be recommended that it should be present in a proportion of from 5 to 25 percent.

The catalytic system is used on a supporting material such as silica, alumina or kaolin. In a preferred embodiment, the catalytic system is used on a silica sol. One preferred method of preparing the catalytic system is as follows: The phosphovanadomolybdate(or, for the purposes of comparison, the phosphomolybdate)heteropolyanion, in the form of the acid or the telluric salt of the acid, is added to a silica sol containing 5 to 10 percent of $SiO_2$. After drying for 24 hours at 120° C, the powder obtained is compressed and then calcined at a temperature of the order of 450° C for 24 hours. The catalytic properties are improved by the compression into pellets and they depend upon the duration and the temperature of calcination. This example of a method of preparation should not be considered as limitative.

The invention is illustrated by the following non-limitative examples which are intended to serve for comparing the development in the course of time of the activity of a catalyst containing the elements phosphorus, molybdenum and vanadium in the form of the phosphovanadomolybdic heteropolyanion, with that of catalysts based on the phosphomolybdic anion. These examples show the increase in the activity and the selectivity of a catalyst containing a phosphovanadomolybdic heteropolyanion. Above all they show the stability of such a catalyst in the course of time, relative to a catalyst which contains only the phosphomolybdate heteropolyanion, possibly with vanadium in the form of $V_2O_5$.

EXAMPLES 1 and 2

Working at 400° C, propylene, ammonia and oxygen are introduced in the following proportions by volume:

$C_3H_6$: 9.2%
$NH_3$: 9.2%
$O_2$: 13.8%
$H_2O$: 12.5%
$N_2$: 55.3%

A contact time of six seconds is used with two different catalysts A and B.

Catalyst A (Example 1) contains:
$H_3PMo_{12}O_{40}$   35%
$TeH_6O_6$   35%
$SiO_2$   30%

Catalyst B (Example 2) contains:
$(NH_4)_{16}P_2V_{16}Mo_{14}O_{95}$   35%
$TeH_6O_6$   35%
$SiO_2$   30%

| Time of Operation (hours) | Conversion of propylene (%) | | Yield (conversion X selectivity) of acrylonitrile | |
|---|---|---|---|---|
| | Cat. A Ex.1 | Cat. B Ex.2 | Cat. A Ex.1 | Cat. B Ex.2 |
| 5 | 65 | 55 | 45 | 46 |
| 18 | 52 | 53 | 36 | 44.5 |
| 48 | 43 | 52 | 30 | 44 |
| 96 | 41 | 52 | 28 | 44 |

These two examples show the use of the catalysts A and B over an extended period of time. There is a decrease in the catalytic activity in Example 1, due to modification of the composition of the catalyst A in the course of time. Moreover, it will be noted that, for substantially the same conversion of propylene, the selectivity with regard to acrylonitrile is greater with the catalyst B.

EXAMPLE 3 and 4

Tests were made with the catalysts A and B after 100 hours of operation. The change in the behavior of the catalyst A has become sufficiently slow to permit the yields of acrylonitrile for the catalysts A and B to be compared at different contact times.

The contact times chosen are 1.5, 3 and 6 seconds; the other experimental conditions are the same as previously.

| Catalyst after 100 hours of operation Contact time (in secs.) | Example 3 A[P, Mo, Te, O] | | | Example 4 B[P, V, Mo, Te, O] | | |
|---|---|---|---|---|---|---|
| | 1.5 | 3 | 6 | 1.5 | 3 | 6 |
| | Test 1 | Test 2 | Test 3 | Test 4 | Test 5 | Test 6 |
| Conversion $C_3H_6$ (%) | 21 | 32 | 41 | 20 | 34 | 52 |
| Selectivity (%): | | | | | | |
| Acrylonitrile | 69 | 70 | 70 | 92.5 | 93 | 84 |
| Acrolein | 6 | 4.5 | 5 | — | — | — |
| Acetonitrile | 11.5 | 14.5 | 14 | 7 | 6 | 7.5 |
| CO + $CO_2$ | 2 | 1 | 5.5 | 3 | 4.5 | 4 |
| Yield (%): | | | | | | |
| Acrylonitrile | 14 | 22.4 | 29 | 18.5 | 31.6 | 43.6 |
| Acyrlonitrile + acrolein | 16 | 23.8 | 31 | — | — | — |

This table enables the results of Examples 1 and 2 to be confirmed. If the yields obtained with the two catalysts for the same degree of conversion are compared, it is found that the introduction of vanadium into the composition of the heteropolyanion enables much increased selectivity with respect to acrylonitrile to be obtained. Moreover, the greater activity of the catalyst B for a contact time of 6 seconds is confirmed.

EXAMPLES 5 and 6

These tests were made with the catalyst B after 100 hours of operation, under experimental conditions corresponding to the conditions used in the previously proposed processes referred to hereinbefore. These conditions enable the best results to be obtained for experimental purposes but they are not always compatible with safety requirements.

These tests permit the catalyst according to the invention to be compared with the best ammono-oxidation catalysts used in the previously proposed processes.

The results are given after 200 hours of operation of the catalyst.

| Example | 5 | 6 |
|---|---|---|
| Reaction temperature (°C) | 412 | 420 |
| Contact time (sec.) | 6 | 6 |
| Composition of the gases (%) | | |
| $C_3H_6$ | 6 | 6 |
| $NH_3$ | 6 | 6.3 |
| $O_2$ | 12 | 13 |
| $H_2O$ | 12.5 | 12.5 |
| $N_2$ | 63.5 | 62.2 |
| Conversion $C_3H_6$ (%) | 71 | 75 |
| Selectivity (%) | | |
| Acrylonitrile | 80 | 88 |
| Acrolein | 9 | — |
| Acetonitrile | 3 | 3.5 |
| Yields (%) | | |
| Acrylonitrile | 57 | 66 |
| Acrylic products | 63 | — |

These results show that for a contact time of 6 seconds, conversions of propylene of 71.75% are obtained, with degrees of selectivity with respect to acrylonitrile of 80 to 88 percent and with yields of 57 to 66 percent for a catalyst which has been used for 200 hours.

These results are comparable and even superior to those obtained with the catalysts proposed hitherto, before the latter have been used (aged).

We claim:

1. In a process for the preparation of acrylonitrile from propylene by reacting said propylene in a gaseous state with oxygen in the presence of ammonia and in contact with a catalyst, the improvement which comprises employing a phosphovanadomolybdic heteropolyanion containing catalyst selected from the group consisting of phosphovanadomolybdic acid, the ammonium, antimony and tellurium salts thereof, and mixtures thereof.

2. A process according to claim 1, wherein at least a part of said heteropolyanion is

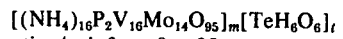

in which the ratio $t/m$ is from 0 to 30.

3. A process according to claim 2, wherein said ratio is from 12 to 18.

4. A process according to claim 2, wherein said ratio is 17.5.

5. A process according to claim 1, wherein a gaseous mixture comprising said propylene, oxygen and ammonia at a temperature from 300° to 600° C is contacted with said catalyst for from 0.15 to 15 seconds.

6. A process according to claim 5, wherein said gaseous mixture contains by volume, 1 to 15 percent of said propylene, 1 to 15 percent of ammonia and 2 to 14 percent of oxygen, the remainder being an inert gaseous medium.

7. A process according to claim 6, wherein said inert gaseous medium contains nitrogen.

8. A process according to claim 6, wherein said inert gaseous medium contains water vapor.

9. A process according to claim 6, wherein said gaseous mixture at a temperature from 350° to 450° C, is contacted with said catalyst for from 1.5 to 8 seconds.

10. A process according to claim 1, wherein said catalyst is supported on silica, said supported catalyst has been calcined at a temperature between 400°–500° C., and wherein from 75 to 25 percent by weight of said supported catalyst is said heteropolyanion.

11. A process according to claim 10, wherein said catalyst contains by weight, 35 percent of phosphovanadomolybdic heteropolyanion, 35 percent of telluric acid and 30 percent of silica.

* * * * *

PO-1050
(5/69)

UNITED STATES PATENT OFFICE
CERTIFICATE OF CORRECTION

Patent No. 3,678,091　　　　　　　　　Dated　July 18, 1972

Inventor(s) Philippe Reulet et al

It is certified that error appears in the above-identified patent and that said Letters Patent are hereby corrected as shown below:

Abstract, line 6, for "phosphovanadomolyboic" read -- phosphovanadomolybdic --.
      Column 3, line 57, read "Test", 5th instance, between "3" on line 56 and "5" on line 58; line 58, read "1" under "Test", first instance, on line 57; line 61, for "92.593" read -- 92.5 93 --; line 66, for "Acrylonitrile" read -- Acrylonitrile + acrolein --; line 69, delete "+ acrolein".
      Column 5, line 1, for "6" read -- 5 --.

Signed and sealed this 2nd day of January 1973.

(SEAL)
Attest:

EDWARD M. FLETCHER, JR.　　　　　　　　　ROBERT GOTTSCHALK
Attesting Officer　　　　　　　　　　　　　Commissioner of Patents